United States Patent [19]

Okamura et al.

[11] 4,195,844
[45] Apr. 1, 1980

[54] AUDIOVISUAL CARD REPRODUCING DEVICE

[75] Inventors: Yasushi Okamura; Harukazu Manabe, both of Fukuoka, Japan

[73] Assignee: Matsushita Electric Industrial Co., Ltd., Osaka, Japan

[21] Appl. No.: 921,737

[22] Filed: Jul. 3, 1978

[30] Foreign Application Priority Data

| Jul. 13, 1977 | [JP] | Japan | 52-84571 |
| Jul. 13, 1977 | [JP] | Japan | 52-84572 |
| Jul. 13, 1977 | [JP] | Japan | 52-84573 |
| Jul. 13, 1977 | [JP] | Japan | 52-84574 |
| Jul. 13, 1977 | [JP] | Japan | 52-84575 |
| Mar. 22, 1978 | [JP] | Japan | 53-37017[U] |

[51] Int. Cl.$^2$ ............... G11B 3/40; G11B 25/04
[52] U.S. Cl. .......................... 274/9 B; 274/9 C
[58] Field of Search ................ 274/9 B, 9 C

[56] References Cited

U.S. PATENT DOCUMENTS

| 3,484,111 | 12/1969 | Staar | 274/9 B |
| 3,883,146 | 5/1975 | Johnson et al. | 274/9 C |
| 3,952,170 | 4/1976 | Irvin et al. | 274/9 C |
| 4,111,430 | 9/1978 | Johnson | 274/9 B |
| 4,118,038 | 10/1978 | Watanabe | 274/9 C |

FOREIGN PATENT DOCUMENTS 869376 5/1961 United Kingdom ............ 274/9 B

*Primary Examiner*—Steven L. Stephan
*Attorney, Agent, or Firm*—Burgess, Ryan and Wayne

[57] ABSTRACT

An audiovisual card reproducing device of the type in which when an audiovisual card is inserted into a slit in a cabinet, visual information printed on the upper surface of the card may be viewed through a window while audio information recorded on a disk-record mounted on the undersurface of the card may be reproduced. Means is provided for correctly locating the inserted card and holding it in operative position. Furthermore, preventive means is provided for preventing the damage to the program groove of the disk-record and a stylus when an ejection button is depressed or the inserted card is pulled out by mistake in the play mode.

5 Claims, 16 Drawing Figures

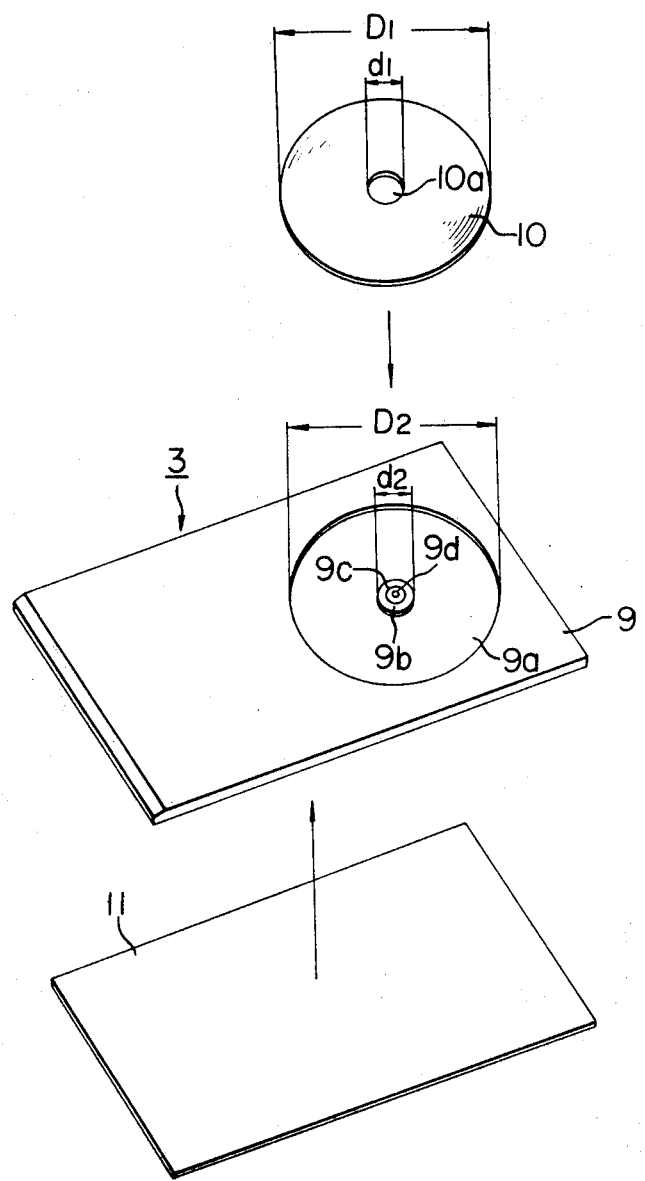

FIG. 14
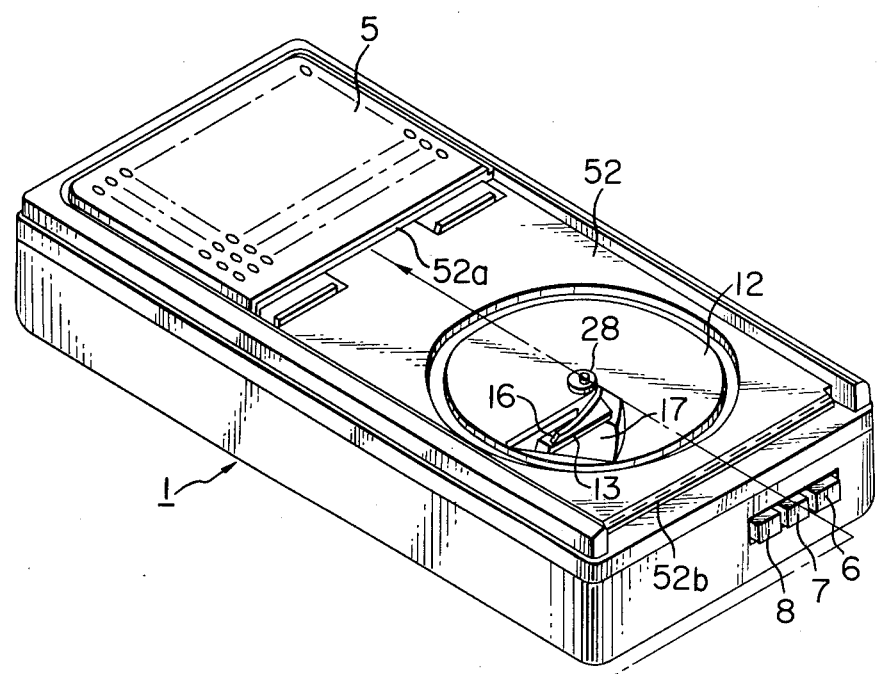
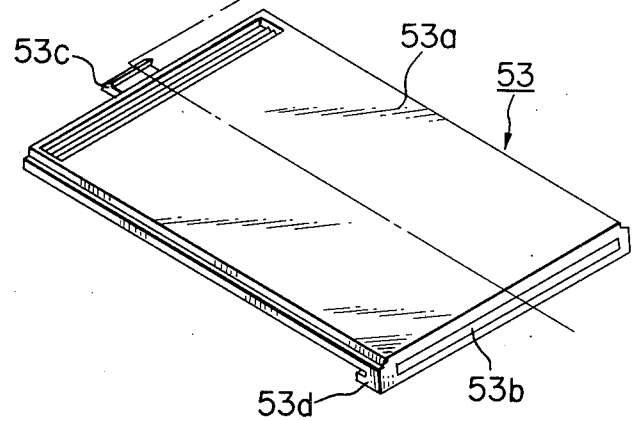

AUDIOVISUAL CARD REPRODUCING DEVICE

BACKGROUND OF THE INVENTION

The present invention relates to an audiovisual card reproducing device for reproducing audio information recorded on a disk-record mounted on the lower surface of an audiovisual card while displaying visual information printed on the upper surface of the card.

In general, the record player comprises fundamentally a turntable rotatably mounted on a cabinet and a pickup arm one end of which is pivoted to the cabinet in such a way that a stylus or needle at the other end may follow the wavy spiral groove in a record on the turntable. However, as disclosed in U.S. Pat. Nos. 3,883,146 and 3,952,170, there has been devised and demonstrated a record player of the type wherein a pickup arm is pivoted on a turntable for rotation in unison therewith so as to follow the spiral groove in a record which is held stationary. This record player is generally used for reproducing audio information recorded in a record printed together with visual information such as picture, illustration and instructions on a card of large size or on each page of a book by placing the record player over the recorded surface. Therefore the reproduction is limited to the audiovisual card or the like which must be held stationary. Furthermore both the audio and visual information are printed on the same surface of the card or the like so that the latter becomes large in size. Moreover when the record player is displaced relative to the recorded surface in the play mode, the stylus causes the damages of the spiral groove in the record. In addition if the record player is not correctly aligned with the recorded surface, the stylus is damaged by the contact with a portion of the recorded surface which is not grooved. The same problems arise even when the record player is directly placed on a desk or the like. When the record player is provided with a record guide which engages with the rim of the record in order to align the record player with the record, the program groove in the record is damaged by the record guide. When a pilot pin is inserted into the center hole of the record in order to align the record player with the record, the pilot pin tends to damage the program groove.

SUMMARY OF THE INVENTION

One of the objects of the present invention is therefore to provide an audiovisual card reproducing device wherein upon insertion of an audiovisual card into the reproducing device, a pilot pin is advanced toward the card and inserted into a pilot pin hole formed in the card so that a disk-record and a turntable may be concentrically located with a higher degree of accuracy.

Another object of the present invention is to provide an audiovisual card reproducing device which cannot be switched into the play mode when no card is inserted, whereby the damage to the stylus may be avoided.

A further object of the present invention is to provide an audiovisual card reproducing device wherein when the card is pulled out by mistake in the play mode, the stylus may be automatically retracted away from the disk-record, whereby the damages to the stylus and to the program groove in the record may be prevented.

A further object of the present invention is to provide an audiovisual card reproducing device wherein when a card ejection button is operated by mistake in the play mode, the stylus may be automatically retracted away from the disk-record and the card may be automatically ejected.

A further object of the present invention is to provide an audiovisual card consisting of a base made of plastic, a printed sheet bearing the visual information and bonded or otherwise attached to the upper surface of the base and a disk-record bearing the audio information and bonded otherwise attached to the lower surface of the base, the base being formed with a pilot or guide pin hole for concentrically locating the disk-record with respect to a turntable and a pilot pin guide for facilitating the insertion of the pilot pin into the pilot pin hole.

A further object of the present invention is to provide an audiovisual card reproducing device which may lock the eject operation during the play mode so that the damages to the program groove in the disk-record and the stylus may be prevented.

A further object of the present invention is to provide an audiovisual card reproducing device of the type wherein a card holder consisting of a transparent panel may be detachably mounted on a cabinet or a main body of the reproducing device in such a way that when the card holder is removed, the pickup arm is exposed out of the cabinet or the main body, whereby the cleaning or replacement of the stylus may be facilitated.

A further object of the present invention is to provide an audiovisual card reproducing device wherein when the card holder is mounted in the cabinet or the main body and then an audiovisual card is inserted into the card holder, the card holder may be made into secure engagement with the cabinet or the main body so that it may be prevented from being pulled out during the play mode.

To the above and other ends, briefly stated, the present invention provides an audiovisual card reprducing device having a cabinet with a slit into which is inserted an audiovisual card, a turntable disposed for rotation within the cabinet or the main body in opposed relationship with the grooved surface of the disk-record or the inserted card, and a pickup pivoted to the turntable and positionable in resilient contact with the disk-record of the inserted card.

BRIEF DESCRIPTION OF THE DRAWINGS

FIG. 2 is an exploded, perspective view of an audiovisual card;

FIG. 14 is an exploded perspective view of a third embodiment of the present invention;

Same reference numerals are used to designate similar parts throughout the figures.

DESCRIPTION OF THE PREFERRED EMBODIMENTS

First Embodiment, FIGS. 1–12

Figure 1:
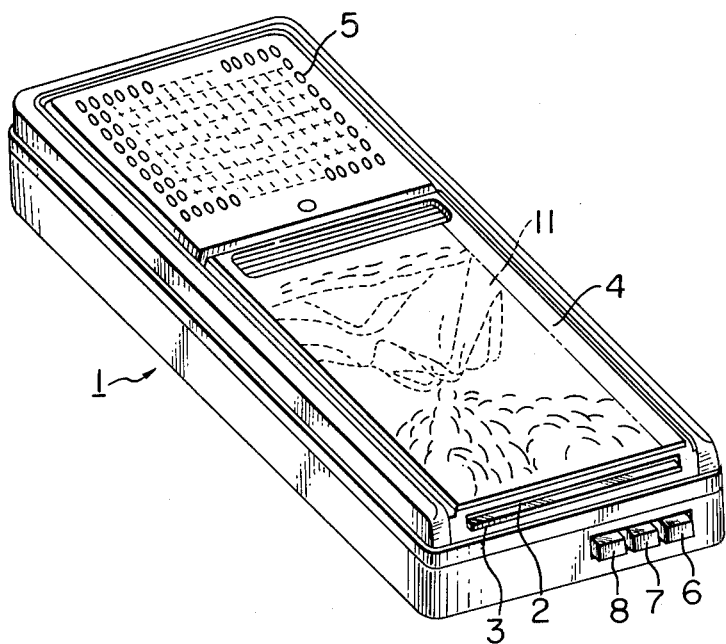
FIG. 1 is a perspective view of a first embodiment of an audiovisual card reproducing device in accordance with the present invention.

FIG. 1 shows a perspective view of a first embodiment of an audiovisual reproducing device in accordance with the present invention. It has a cabinet or a main body 1 with an elongated slit 2 through which an audiovisual card 3 is inserted into the main body 1, a window 4, a speaker unit 5, a play button 6, an eject button 7 and a stop button 8.

FIG. 2 shows an audiovisual card 3 consisting of a base 9 made of plastic, a disk-record 10 attached to the lower surface of the base 9 and a picture sheet 11 attached to the upper surface of the base 9. The picture sheet 11 is printed with a picture such as landscape as indicated by the broken lines in FIG. 1 so that a user may look it through the window 4 when the card is inserted into the main body 1.

The base 9 is formed with an annular recess 9a into which is fitted and bonded the disk-record 10, a boss 9b for positioning the disk-record 10, a countersunk or an inverted frustoconical pin guide 9c for guiding a pilot pin to be described hereinafter, and a pilot pin 9d for receiving the pilot pin.

The disk-record 10 is formed with a center hole 10a and a program groove 10b.

Next a method for mounting the disk-record 10 on the base 9 will be described. The diameter $d_2$ of the boss 9b of the base 9 is slightly smaller than the diameter $d_1$ of the center hole 10a of the disk-record 10 by such a degree that the center hole 10a may be located concentrically of the boss 9b with a predetermined tolerance. The diameter $D_2$ of the annular recess 9a of the base 9 is slightly greater than the outer diameter $D_1$ of the disk-record 10. Thus when the center hole 10a of the disk-record 10 is fitted over the boss 9a, the disk-record 10 may be precisely mounted on the base 9 as best shown in FIG. 3.

Figure 3:
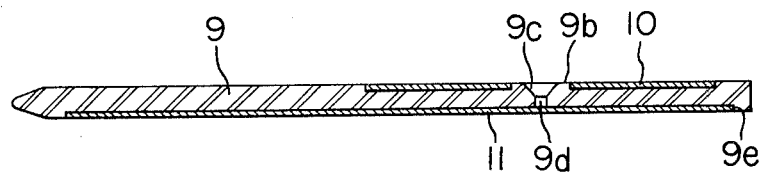
FIG. 3 is a longitudinal sectional view thereof.
Figure 4:
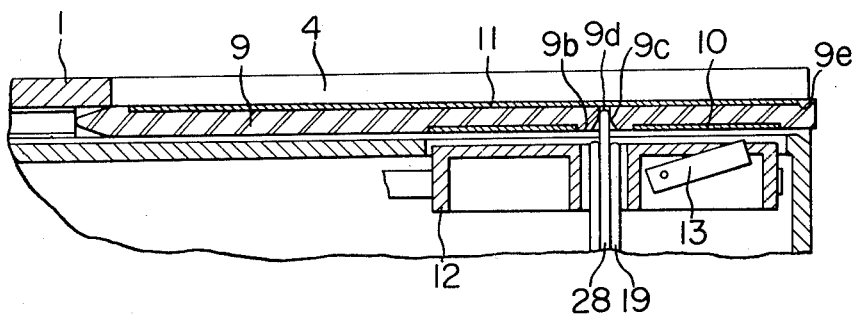
FIG. 4 shows an audiovisual card inserted into a cabinet or a main body of the reproducing device.

As shown in FIG. 3, the picture sheet 11 is fitted into a mating recess 9e formed in the bottom surface of the base 9 and bonded thereto. Instead of the picture sheet 11, visual information may be directly printed over the bottom surface of the base 9.

Figure 5:
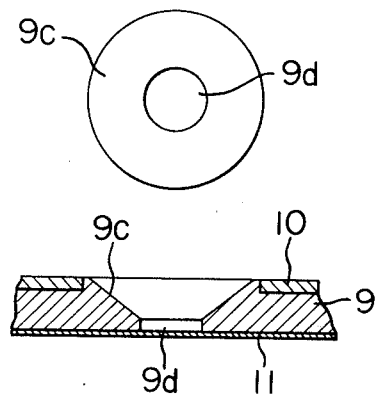
FIG. 5 is a fragmentary sectional view, on enlarged scale, of the card showing a pilot pin guide and a pilot pin hole.
Figure 6:
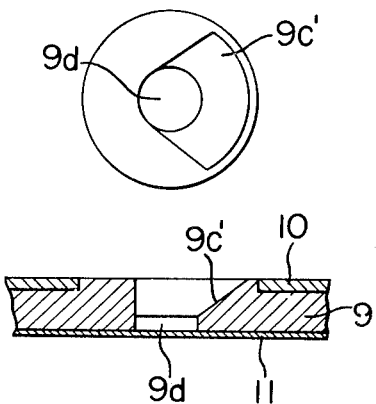
FIGS. 6 and 7 show modifications, respectively, of the pilot pin guide.
Figure 7:
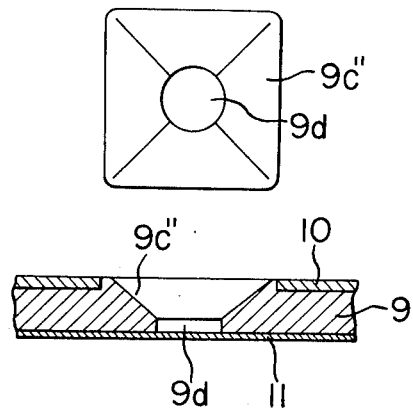

So far the pin guide 9c of the base 9 has been described as being an inverted frustoconical form as best shown in FIG. 5, but it may be made in the form of a part of an inverted frustocone as shown in FIG. 6 or in the form of an inverted frustum of a square pyramid as shown in FIG. 7.

Figure 8:
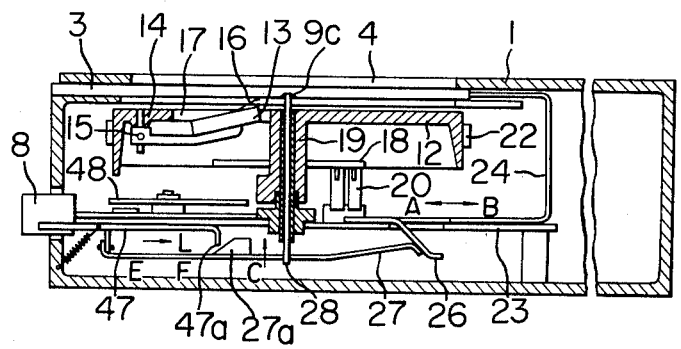
FIG. 8 is a sectional view of the first embodiment.

Referring to FIGS. 4 and 8–12, reference numeral 12 denotes a turntable disposed for rotation within the main body in opposed relationship with the window 4; 13, a pickup which is not only horizontally rotatable about a pin 14 extended from the turntable 12 but also vertically rotatable about a pin 15; 16, a stylus mounted on the pickup; 17, an opening formed through the turntable 12 in order to permit the movement of the pickup 13 as will be described in detail hereinafter; 18, a slip ring mounted on a spindle 19 of the turntable and electrically connected to the output terminal of the pickup 13; 20, an output brush normally made into contact with the slip ring 18; 21, a motor; 22, an endless belt for drivingly coupling the motor 21 to the turntable 12; 23, a chassis; 24, a card rejection member with one end slidably inserted into the card slit 2 and the other end slidably mounted on the chassis 23; 25, a bias spring for normally biasing the card ejection member 24 in the direction indicated by A in FIG. 8 so that a card 3 may be ejected out of the reproducing device as will be described in detail hereinafter.

Figure 9:
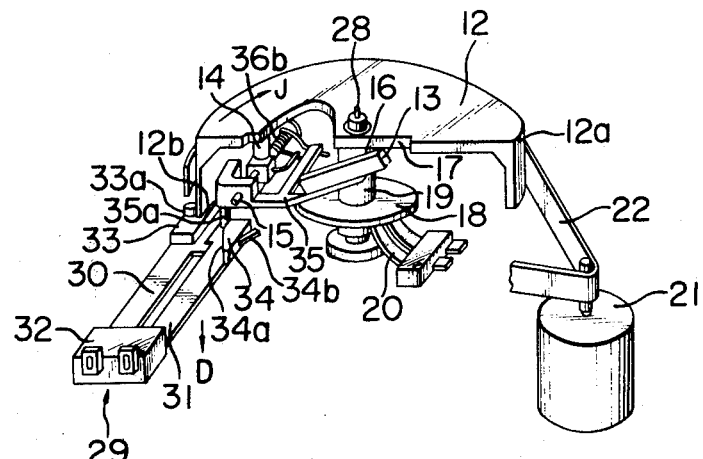
FIG. 9 is a perspective view thereof with a turntable being partially cut out.

Referring to FIGS. 8–12, reference numeral 27 denotes a leaf spring one end of which is securely fixed to the chassis 23, the other end of which is resiliently made into contact with a wedge or a projection 26 struck out of the card rejection member 24 and which normally biases a pilot pin 28 upwardly or in the direction C in FIG. 9; 29, a leaf switch consisting of a pair of parallel contacts 30 and 31 and a contact holder 32 for supporting one ends of the contacts 30 and 31, the leaf switch 29 connecting or disconnecting the motor 21 to or from a power source; 33, a stopper attached to the free end of the contact 30 of the leaf switch 29; 33a, a projection for engagement with a notch 12b of a flange 12a of the turntable 12; 34, a reset member attached to the free end of the contact 31; 34a, a cam surface of the reset member 34 made into contact with a pin 35a extended from a tone arm 35 for resetting the pickup 13 against the force of a spring 36b; 34b, a cam made into contact with a projection 36a struck out of a play-slide plate 36 so that when the latter 36 is pushed into the main body, the reset member 34 as well as the stopper 33 are displaced downward or in the direction D in FIG. 9; 37, a stopper which is pivoted at a midpoint between the ends with a pivot pin 38. One end of the stopper 37 is made into engagement with a notch 24a of the card ejection member 24, and when an audiovisual card 3 is inserted into the slit 2, the card ejection member 24 is displaced in the direction B in FIG. 8 so that the stopper 37 is caused to rotate about the pivot pin 38 in the direction E in FIG. 11, whereby the other end of the stopper 37 is moved away from the path of the play-slide plate 36; 39, a locking plate slidably mounted on the chassis 23 and having pins 41 and 42 which engage with the play-slide plate 36 and a stop-slide plate 40, respectively, thereby locking them as will be described in detail hereinafter; 43, a bias spring for normally biasing the locking plate 39 in the direction F in FIG. 10; 47, a card-eject-slide plate. A projection 47a struck out from the card-eject-slide plate 47 at the leading end thereof is made into contact with a cam 27a attached on the leaf spring 47 (See FIG. 8) when the plate 47 is displaced in the direction L in FIG. 8 so that the leaf spring 27 is depressed downwardly and consequently the pilot pin 28 is moved downward away from the pilot pin hole 9d of the card 3. 48, a lever (See FIG. 12). When one end of the lever 48 is made into engagement with a cam surface 19a of the spindle 19, the lever 48 is caused to rotate about its pivot pin 49. Then the other end of the lever 48 is made into engagement with the pin 42 of the locking plate 39, causing the latter to slide in the direction opposite to the direction F so as to release the play-slide plate 36. The lever 48 is formed with a notch 48a made into engagement with the leading end 24b of the card rejection member in such a way that when the card 3 is inserted, the lever 48 is moved away from the cam surface 19a but when the card 3 is ejected the lever 48 is made into engagement with the cam surface 19a. The lever 57 is biased by a bias spring 50 so that the notch 48a may be normally maintained in contact with the leading end 24b of the card ejection member 24. 51 is a spring for normally biasing the play-slide plate 36 to its inactive position; 54, a spring for normally biasing the stop slide plate 40 to its inactive position; and 55, a spring for normally biasing the eject-slide plate 47 to its inactive position.

Next the mode of operation of the first embodiment with the above construction will be described. In the nonplay mode; that is, when no card 3 is inserted, the projection 33a of the stopper 33 at the free end of the contact 30 of the leaf switch 29 is engaged with the notch 12b of the flange 12a of the turntable 12 so that the contact 30 is slightly bowed downwardly. The second contact 31 remains in its initial position so that the first contact 30 is out of contact with the second contact 31. Thus the leaf switch 29 remains in the OFF state. As shown in FIG. 9, the pin 35a extended from the tone arm 35 is made into engagement with the side surface of the reset member 34 of the second contact 31. Therefore the tone arm 35 remains in such a position that the stylus 16 of the pickup 13 may be retracted into the opening 17 of the turntable 12.

Figure 11:
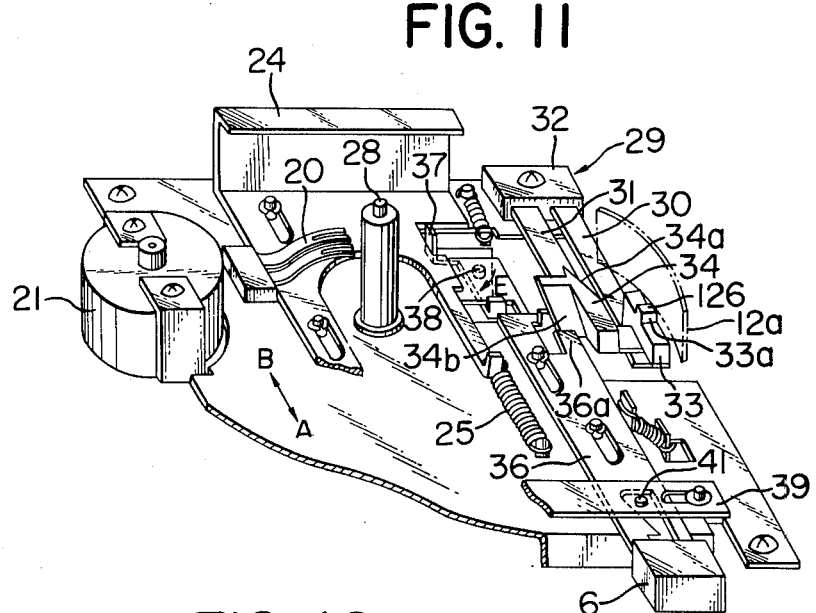
FIG. 11 is a fragmentary perspective view thereof.
Figure 12:
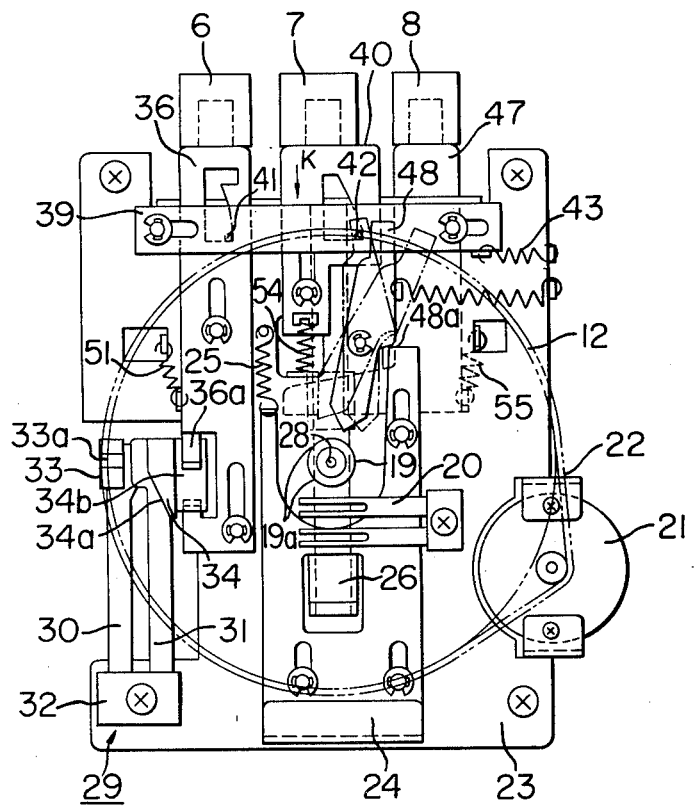
FIG. 12 is a top view thereof.

The card ejection member 24 remains in its initial or inoperative position (in the direction A in FIGS. 8, 11 and 12) under the force of the bias spring 25 so that the lever 48 is out of engagement with the cam surface 19a of the spindle 19 of the turntable 12 as indicated by the solid lines in FIG. 12.

When a user inserts a card 3 into the slit 2, the card 3 pushes the card ejection member 24 in the direction B in FIGS. 8, 11 and 12 so that the leaf spring 27, which is operatively coupled to the card ejection member 24, is deflected upward. As a result, the pilot pin 28 is moved upwardly and inserted into the pilot pin hole 9d through the pilot pin guide 9c of the card 3 so that the disk-record 10 may be located concentrically of the turntable 12. The lever 48 is swung to the position indicated by the broken lines in FIG. 12 away from the cam surface 19a of the spindle 12.

Figure 10:
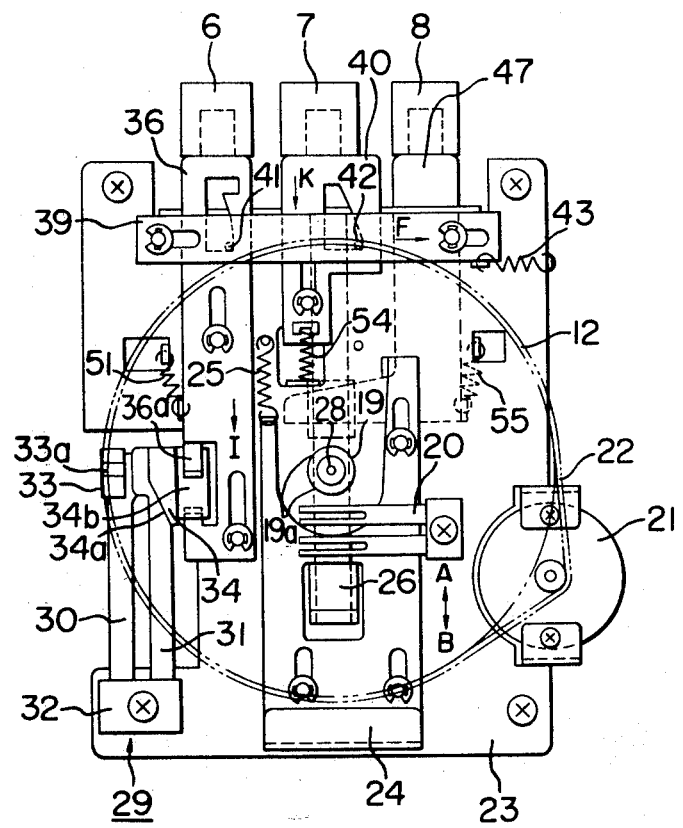
FIG. 10 is a top view thereof.

When the play button 6 is depressed so that the play-slide plate 36 is displaced in the direction I in FIG. 10, the projection 36a of the play-slide plate 36 engages with the cam surface 34b of the reset member 34 so that the latter is displaced downwardly and consequently the second contact 31 is caused to bow downwardly and make into contact with the first contact 30. Thus, the leaf switch connects the power source to the motor 21. In this case, the first contact 30 is further deflected downwardly together with the second contact 31 so that the projection 33a of the stopper 33 at the free end of the first contact 30 is released from the notch 12b of the flange 12a of the turntable 12. Therefore the turntable 12 is turned in the direction J in FIG. 9 by the motor 21. Since the reset member 34 is displaced downwardly as the second contact 31 is deflected downwardly, it is released from the pin 35a so that the tone arm 35 is swung under the force of the spring 36 in such a direction in which the free end of the pickup 12 or the stylus 16 is extended upwardly out of the opening 17 of the turntable 12 and is made into engagement with the program groove of the disk-record 10 mounted on the card 3. Thus the information recorded on the disk-record 10 is reproduced. This reproduction or play mode is maintained as long as the locking plate 39 locks the play-slide plate 36 in the active or play position.

When a user depresses the stop button 7 in the play mode to cause the stop-slide plate 40 to slide in the direction K in FIGS. 10 and 12, the locking plate 39 is caused to shift to the left and is released from the play-slide plate 36. As a result, the play-slide plate 36 is returned to its initial or inactive position under the force of the spring 51 so that the first and second contacts 30 and 31 of the leaf switch 29 are returned to their initial positions. The pin 35a of the tone arm 35 rides over the inclined cam surface 34a of the reset member 34 to the flat side surface thereof contiguous with the inclined cam surface 34a. The tone arm 35 is caused to swing back to its initial or inactive position so that the stylus 16 is retracted into the opening 17 of the turntable 12 away from the disk-record 10.

Even when a user pulls the card 3 out of the reproducing device during the play mode, the reproducing device may be reset automatically. That is, when the card 3 is pulled out in the play mode, the card ejection member 24 is displaced in the direction A in FIG. 12 under the force of the bias spring 25 and the lever 48 is returned to its initial position indicated by the solid lines in FIG. 12. As a result, the lever 48 is made into engagement with the cam surface 19a of the spindle 19 so that the lever 48 is further rotated in the counterclockwise direction. The lever 48 pushes the pin 42 of the locking plate 39 so that the latter is caused to shift to the left out of engagement with the play-slide plate 36. As a result, as in the case of pushing the stop button 7, the slide plate 36 is returned to its initial position and consequently the tone arm 35 is also returned to its initial or inactive position in the manner described above.

In the play mode the pilot pin 28 serves to hold the card 3 in position within the slit 2. When no card is inserted, the card ejection member 24 is in the inoperative or initial position (that is, it is displaced in the direction A in FIG. 8) so that the wedge or projection 26 of the card ejection member 24 pushes the leaf spring 27 downwards so that the pilot pin 28 is retracted downwards away from the top surface of the turntable 12. Thus the pilot pin 28 offers no obstacle against the insertion of the card 3. When the card 3 is inserted into the slit, the card ejection member 24 is displaced to the position shown in FIG. 8 so that the leaf spring 27 springs back upwardly so that the pilot pin 28 is moved upward, engages with the under surface of the card 3 and is finally fitted into the pilot pin hole 9d of the disk-record 10, thereby preventing the card 3 from being pulled out of the slit 2.

When a user pushes the eject button 8, the card 3 is automatically ejected out of the slit 2 and the reproducing device is also automatically reset or returned to the non-play mode as will be described in detail below. Upon depression of the eject button 8, the eject-slide plate 47 is displaced in the direction L in FIG. 8 so that the projection 47a of the eject-slide plate 47 engages with the cam 27a on the leaf spring 27. The leaf spring 27 is therefore deflected downwardly so that the pilot pin 28 is retracted downwardly away from the pilot pin hole 9d of the card 3. Then the card ejection member 24 is displaced in the direction A under the force of the bias or return spring 25 (See FIG. 11) so that the card 3 is ejected out of the slit 2 by the card ejection member 24. When the card ejection member 24 is displaced in the direction A in FIG. 8, it turns the lever 48 so that the locking plate 39 releases the play-slide plate 36. Then the play-slide plate 36 returns to its initial or inoperative position under the force of the bias spring 51.

More particularly, when the lever 48 is turned so that its one end engages with the cam surface 19a of the spindle 19, the lever 48 is turned by the spindle 19 so as to displace the locking plate 39 out of engagement with the play-slide plate 36.

As described above, the card ejection operation is very simple. Furthermore even when the card is pulled out in the play mode, the reproducing device may be automatically reset. Thus the operability may be much improved.

When no card 3 is inserted into the slit 2, the card ejection member 24 is held in its initial or inoperative position under the force of the bias or return spring 25 as shown in FIG. 11. The other end of the stopper 37 is located in the path of the play-slide plate 36. As a result, even when the play button 6 is depressed, the inner end of the slide plate 36 immediately engages with the other end of the stopper 37 so that the play button 6 cannot be depressed completely. As a consequence the pickup 13 remains in the inoperative position.

As described above, the first embodiment of the audiovisual card reproducing machine in accordance with the present invention is very simple in construction and compact in size may completely prevent the damage to the stylus when the card is inserted and offer excellent operability. It may be used as an audio reproducing device as well as a teaching machine.

Figure 13:
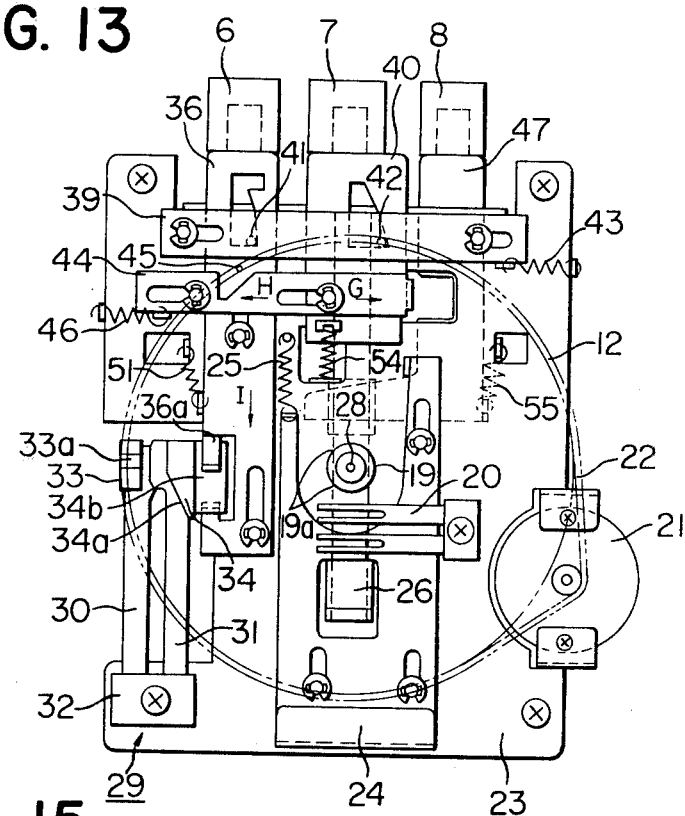
FIG. 13 is a top view of a second embodiment of the present invention.

Second Embodiment, FIG. 13

The second embodiment of the present invention to be described below with reference to FIG. 13 is different from the first embodiment in that the second embodiment includes a mechanism for preventing or inhibiting the ejection operation during the play mode.

Referring to FIG. 13, an ejection locking member 44 is mounted for slidable movement in the directions G and H at right angles to the direction I of movement of the play-slide plate 36 and is normally biased in the direction H under the force of a bias or return spring 46. When the play-slide plate 36 is displaced in the direction I to its operative position, a pin 45 extended from the plate 36 engages with the inclining edge of a notch formed in the ejection locking member 44 so that the latter is displaced to the right against the bias or return spring 46 and the left end of the locking member 44 engages with a locking notch 47b formed in the eject-slide plate 47, thereby locking it. Therefore even when the card ejection button 8 is depressed during the play mode, the displacement of the eject-slide plate 47 is locked so that the card 3 cannot be ejected out of the slit 2.

When the play-slide plate 36 is returned to its initial or inoperative position, the engaging pin 45 is out of engagement with the notch of the ejection locking member 44 so that the latter is returned to its initial or inoperative position and consequently the left end thereof is out of engagement with the locking notch 47b of the eject-slide plate 47. Therefore the sliding movement of the eject-slide plate 47 is permitted. Thus when the ejection button 8 is depressed, the card 3 is automatically ejected out of the slit 2 in the manner described elsewhere with particular reference to FIG. 8.

As described above, according to the second embodiment of the present invention the ejection of the card 3 during the play mode is completely prevented. Therefore even when a user erroneously depresses the ejection button 8 during the play mode, the damage to the card 3 by the stylus 16 or the damage to the stylus by the card 3 may be completely avoided. The card 3 may be ejected out of the reproducing device only when the latter is in the inoperative mode.

Figure 15:
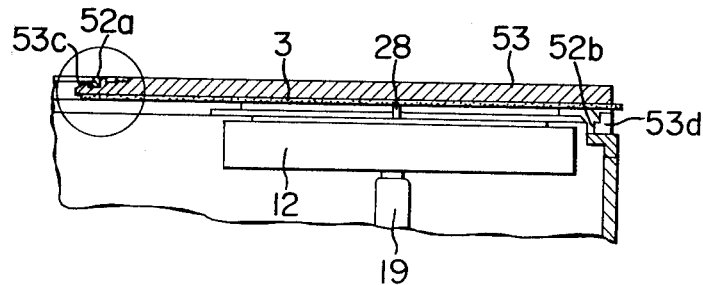
FIG. 15 is a fragmentary sectional view, on enlarged scale, thereof.
Figure 16:
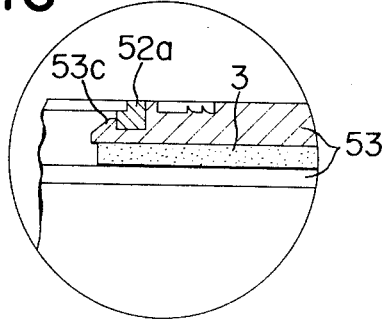
FIG. 16 is a detailed view of a portion of encircled in FIG. 15.

Third Embodiment, FIGS. 14–16

According to the third embodiment of the present invention, the replacement of a worn stylus as well as the cleaning thereof may be much facilitated as will be described in detail below with reference to FIGS. 14–16.

In the first and second embodiments, the window 4 is directly formed in the main body 1, but according to the third embodiment, a card holder 53 having a transparent top panel 53a through which the picture on the card 3 may be viewed and a card insertion slit 53b may be detachably mounted on the cabinet or the main body 1.

The main body 1 is provided with a card holder mount 52 upon which is detachably mounted the card holder 53. The card holder mount 52 is formed with a hole in which is located the turntable 12 with the pickup 13 having the stylus 16 and with first and second engaging members 52a and 52b along the front and rear edges.

First the card holder 53 without the card 3 is inserted into the mount 52. Then a first hook 53c with the first engaging member 52a while a second hook 53d with the second engaging member 52b. Thereafter the card 3 is inserted into the slit 53b of the card holder 53. Because the card 3 has a thickness, the first and second hooks 53c and 53d of the card holder 53 are pushed upwardly and downwardly, respectively, as best shown in FIG. 15 so as to firmly engage with the corresponding first and second engaging members 52a and 52b. As a result, once the card 3 is inserted into the card holder 3, the latter cannot be pulled out of the card holder mount 52.

When a user pushes lightly down the front edge of the card holder 53 or the transparent panel 53a after he or she has pulled the card 3 out of the card holder 53, the first hook 53c is easily released from the first engaging member 52a. Thereafter the user pulls the card holder 53. Then the second hook 53d of the card holder 53 is readily released from the second engaging member 52b of the card holder mount 52, whereby the user may completely pull the card holder 53 out of the card holder mount 52. The turntable 12 and the pickup 13 are exposed so that the replacement or cleaning of the stylus 16 may be effected in a simple manner without the disassembly of the main body or cabinet 1. Since the card holder 53 cannot be removed out of the reproducing device when the card 3 is inserted into the slit 53b of the card holder 53, the erratic removal of the card holder 53 during the play mode may be positively prevented and the damages to the stylus 16 and the disk-record 10 may be completely avoided.

What is claimed is:

1. An audiovisual card reproducing device for reproducing visual and audio information from an audiovisual card having an upper surface imprinted with the visual information and a lower surface comprising a spiral program groove containing audio information, said device comprising:
   a cabinet having a slit for receiving said card in a horizontal position;
   a turntable rotatable in a horizontal plane below said program groove and having an upper surface in juxtaposition therewith, said turntable having a hole therein disposed between the center and the periphery of the turntable;

pilot pin means for vertically aligning the center of said program groove with the axis of rotation of said turntable;

a tone arm pivotally mounted to the lower surface of said turntable for rotation therewith in a horizontal plane, and for rotation with respect to said turntable about horizontal and vertical axes adjacent the turntable periphery;

a card ejection member disposed in said slit in said cabinet so that when said audiovisual card is inserted into said slit, said card ejection member engages said card and is displaced to the operative position thereof as said card is pushed toward said horizontal receiving position;

a play-slide plate movable between an off position and a reproduce position;

a stopper disposed adjacent said play-slide plate and operatively coupled to said card ejection member to lock said play-slide plate in the off position thereof, so as to prevent movement thereof when no audiovisual card is disposed in said cabinet; and means operative only when said play-slide plate is in the reproduce position thereof, for rotating said turntable and causing said tone arm to pivot about said horizontal axis, so that said tone arm extends through said turntable hole to engage said program groove.

2. The audiovisual device according to claim 1, wherein said audiovisual card comprises (i) a base with a disk-record positioning boss, and (ii) a disk-record having said program groove and a center hole, said disk-record being mounted on said base with said center hole being snugly fitted over said disk-record positioning boss and then bonded securely to said base, said disk-record positioning boss of said base being formed with a pilot pin hole and a generally frustoconical or frustopyramidal pilot pin guide, said pilot pin means comprising a pilot pin for engaging said pilot pin hole to hold the inserted audiovisual card in position.

3. The audiovisual device according to claim 1, further comprising a lever disposed within said cabinet and operatively coupled to said card ejection member so that said lever is caused to swing by the turning force of the turntable when said inserted card is pulled out of said slit, thereby causing said stopper to release said play-slide plate and cause said plate to return to the inoperative position thereof.

4. The audiovisual device according to claim 1, wherein said audiovisual card has a pilot pin hole in the center of said program groove, said card ejection member being normally biased to return toward an inoperative position thereof so as to push the inserted card out of said slit by means of a bias or return spring, said card ejection member being shifted to said operative position as the audiovisual card is inserted into said slit, said pilot pin means comprising a pilot pin operatively coupled to said card ejection member in such a way that when the audiovisual card is inserted into said operative position said pilot pin engages with a pilot pin hole of said inserted card, thereby retaining said inserted card in said operative position; said device further comprising eject means for releasing said pilot pin out of engagement with said pilot pin hole of said inserted card independently of the operation of said card ejection member, and locking means for rendering said eject means inoperative when said play-slide member is in the reproduce position thereof, whereby said eject means may release the pilot pin from engagement with said pilot pin hole of said inserted card and said card ejection member may push said inserted card out of said slit, only when said device is not reproducing said information.

5. An audiovisual card reproducing device of the type wherein an audiovisual card having an upper surface printed with visual information such as picture and/or letters and a lower surface formed with a program groove is inserted into a slit of a cabinet so that audio information recorded in said program groove may be reproduced by means of a pickup pivoted to a turntable, characterized in that a card ejection member is disposed in said slit in said cabinet in such a way that when an audiovisual card is inserted into said slit, said card ejection member engages with said inserted card and is displaced to its operative position as said card is pushed toward its operative position;

a play-slide plate is disposed on a chassis within said cabinet for controlling a reproduction system; and a stopper is disposed adjacent to said play-slide plate and operatively coupled to said card ejection member so as to lock said play-slide plate, whereby the depression of a play button may be prevented when no audiovisual card is inserted into said cabinet.

* * * * *